US008843896B2

(12) United States Patent
Haber et al.

(10) Patent No.: US 8,843,896 B2
(45) Date of Patent: *Sep. 23, 2014

(54) METAMODELING CONTEXTUAL NAVIGATION OF COMPUTER SOFTWARE APPLICATIONS

(71) Applicant: International Business Machines Corporation, Armonk, NY (US)

(72) Inventors: Marc N. Haber, Efrat (IL); Benjamin Halberstadt, Jerusalem (IL); Hayden Marchant, Ramat Bet Shemeseh (IL); Boris Melamed, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/795,449

(22) Filed: Mar. 12, 2013

(65) Prior Publication Data
US 2013/0191813 A1    Jul. 25, 2013

Related U.S. Application Data

(63) Continuation of application No. 12/568,934, filed on Sep. 29, 2009.

(51) Int. Cl.
*G06F 9/44* (2006.01)
*G06F 11/36* (2006.01)
*G06F 9/45* (2006.01)

(52) U.S. Cl.
CPC ............ *G06F 11/3608* (2013.01); *G06F 8/433* (2013.01); *G06F 8/43* (2013.01); *G06F 8/75* (2013.01)
USPC .......................................... 717/124; 717/132

(58) Field of Classification Search
CPC .............. G06F 8/43; G06F 8/433; G06F 8/75
USPC .......................................................... 717/124
See application file for complete search history.

(56) References Cited

U.S. PATENT DOCUMENTS 6,848,100 B1 * 1/2005 Wu et al. ....................... 717/157
7,185,016 B1   2/2007 Rasmussen
(Continued)

OTHER PUBLICATIONS

"OCL Developer's Guide, Programmer's Guide; OCL Relationship to Metamodels," [online] IBM Corporation, et al., Eclipse.Org 2000, 2007 [retrieved Jun. 17, 2010] retrieved from the Internet: <http://help.eclipse.org/ganymede/topic/org.eclipse.ocl.doc/references/overview/targetMeta>.

*Primary Examiner* — Elias Mamo
*Assistant Examiner* — John Roche
(74) *Attorney, Agent, or Firm* — Terry Carroll: SVL IP Law

(57) ABSTRACT

Using metamodels during context-sensitive analyzes of reusable components of computer software applications, including identifying entry and exit paths into and from a reusable component within a metamodel of a computer application development environment, determining during a static analysis of a computer software application that navigation will proceeds along a path corresponding in the metamodel to such an entry or exit path, retaining, if an entry path, an identifier of an invoking node along the path within the computer software application, and, if an exit path, for each terminal node along each of a plurality of paths from the reusable component within the computer software application, comparing an identifier of an invoking node preceding the terminal node with the retained invoking node identifier, and determining, if the invoking node identifiers match, that the path among the plurality of paths is a correct path for a current context of the static analysis.

3 Claims, 10 Drawing Sheets

(56) References Cited

U.S. PATENT DOCUMENTS

| | | | |
|---|---|---|---|
| 7,475,080 B2 | 1/2009 | Chowdbary et al. | |
| 2004/0243645 A1* | 12/2004 | Broder et al. | 707/200 |
| 2005/0262091 A1* | 11/2005 | Marvin et al. | 707/10 |
| 2006/0064666 A1 | 3/2006 | Amaru et al. | |
| 2006/0117037 A1 | 6/2006 | Gutz et al. | |
| 2006/0150160 A1* | 7/2006 | Taft et al. | 717/126 |
| 2006/0282819 A1* | 12/2006 | Graham et al. | 717/113 |
| 2007/0016894 A1* | 1/2007 | Sreedhar | 717/131 |

* cited by examiner

METAMODELING CONTEXTUAL NAVIGATION OF COMPUTER SOFTWARE APPLICATIONS

CROSS REFERENCE TO RELATED APPLICATIONS

The present invention claims priority to U.S. Nonprovisional application Ser. No. 12/568,934, filed on 29 Sep. 2009 and entitled "Metamodeling Contextual Navigation of Computer Software Applications," the disclosure of which is incorporated herein by reference in its entirety.

BACKGROUND

The invention relates generally to static analysis of computer software applications.

Computer software applications may be represented as abstract models using modeling methodologies such as the Unified Modeling Language (UML). Furthermore, computer application development environments themselves may be represented as abstract models, and these models are commonly referred to as "metamodels." Thus, for example, a metamodel of the C++ programming language may be used to understand elements of the C++ programming language, whereas a model of an inventory application written in the C++ programming language may be used to understand elements of the inventory application.

Computer software applications are often analyzed using various techniques to determine their behavior. One testing methodology, commonly referred to as "static analysis," involves analyzing a computer software application while applying only static considerations (i.e., without executing the computer software application). One challenge of static analysis techniques relates to determining the behavior of reusable components of computer software applications, such as procedures or functions, that may have different behavior in different contexts. For example, a reusable sorting procedure may have customer records passed to it in one context, and employee records passed to it in another, where the procedure passes the sorted records to different destinations depending on the context. Static analysis of a reusable component that is performed without consideration to the component's context may wrongly suggest that all outcomes of the component are to occur in every context.

SUMMARY

The invention in embodiments thereof discloses novel systems, methods, and computer program products for using metamodels in support of performing context-sensitive analysis of reusable component of computer software applications.

In one embodiment of the invention, a method is provided for using metamodels in support of performing context-sensitive analyses of reusable components of computer software applications, the method including identifying an entry path into a reusable component within a metamodel of a computer application development environment, where the entry path is from a node of the metamodel, to an invoking node of the metamodel and that follows the node, to the reusable component, and to a first node within the reusable component, where the reusable component is invokable by the invoking node, identifying an exit path from the reusable component within the metamodel, where the exit path is from a last node within the reusable component, to the invoking node, and to a node of the metamodel that follows the invoking node, selecting an object in a computer software application during a static analysis of the computer software application, where the computer software application was developed using the computer application development environment to which the metamodel relates, determining during the static analysis that navigation within the computer software application is to proceed from the computer software application object's location along a path that corresponds in the metamodel to either of the entry path into the reusable component and the exit path from the reusable component, if the navigation within the computer software application is to proceed along a path that corresponds to the entry path, retaining an identifier of an invoking node along the path within the computer software application, and if the navigation within the computer software application is to proceed along a path that corresponds to the exit path, for each terminal node along each of a plurality of paths from the object, comparing an identifier of an invoking node preceding the terminal node with the retained invoking node identifier, and determining, if the invoking node identifiers match, that the path among the plurality of paths is a correct path for a current context of the static analysis, where each of the steps are implemented in either of a) computer hardware configured to perform the steps, and b) computer software embodied in a physically tangible computer-readable storage medium.

In another embodiment of the invention, the method further includes annotating the entry path with a reference to the invoking node and an indication that the entry path is an entry path into the reusable component, and annotating the exit path with a reference to the invoking node and an indication that the exit path is an exit path from the reusable component.

In another embodiment of the invention, the step of annotating the entry path includes annotating the entry path with a context type identifying the type of reuse context of the reusable component, the step of annotating the exit path includes annotating the exit path with the context type, and the entry path and exit path corresponding to the navigations are annotated with the same context type.

In another embodiment of the invention, a system is provided for using metamodels in support of performing context-sensitive analyses of reusable components of computer software applications, the system including a context annotator configured to identify an entry path into a reusable component within a metamodel of a computer application development environment, where the entry path is from a node of the metamodel, to an invoking node of the metamodel and that follows the node, to the reusable component, and to a first node within the reusable component, where the reusable component is invokable by the invoking node, and identify an exit path from the reusable component within the metamodel, where the exit path is from a last node within the reusable component, to the invoking node, and to a node of the metamodel and that follows the invoking node, a static analyzer configured to select an object in a computer software application during a static analysis of the computer software application, where the computer software application was developed using the computer application development environment to which the metamodel relates, determine during the static analysis that navigation within the computer software application is to proceed from the computer software application object's location along a path that corresponds in the metamodel to either of the entry path into the reusable component and the exit path from the reusable component, if the navigation within the computer software application is to proceed along a path that corresponds to the entry path, retaining an identifier of an invoking node along the path within the computer software application, and if the navigation within the computer software application is to proceed along a path that corresponds to the exit path, for each terminal node along each of a plurality of paths from the object, compare an identifier of an invoking node preceding the terminal node with the retained invoking node identifier, and determine, if the invoking node identifiers match, that the path among the plurality of paths is a correct path for a current context of the static analysis, where the context annotator and static analyzer are implemented in either of a) computer hardware configured to perform the functions of the context annotator and static analyzer, and b) computer software embodied in a physically tangible computer-readable storage medium.

In another embodiment of the invention, the context analyzer is configured to annotate the entry path with a reference to the invoking node and an indication that the entry path is an entry path into the reusable component, and annotate the exit path with a reference to the invoking node and an indication that the exit path is an exit path from the reusable component.

In another embodiment of the invention, the context analyzer is configured to annotate the entry path with a context type identifying the type of reuse context of the reusable component, and annotate the exit path with the context type, and where the entry path and exit path corresponding to the navigations are annotated with the same context type.

In another embodiment of the invention, a system is provided for annotating metamodels in support of performing context-sensitive analyses of reusable components of computer software applications, the system including a metamodel of a computer application development environment, where the metamodel is embodied in a physically tangible computer-readable storage medium, and a context annotator configured to identify an entry path into a reusable component within a metamodel of a computer application development environment, where the entry path is from a node of the metamodel, to an invoking node of the metamodel and that follows the node, to the reusable component, and to a first node within the reusable component, where the reusable component is invokable by the invoking node, identify an exit path from the reusable component within the metamodel, where the exit path is from a last node within the reusable component, to the invoking node, and to a node of the metamodel and that follows the invoking node, annotate the entry path with a reference to the invoking node and an indication that the entry path is an entry path into the reusable component, and annotate the exit path with a reference to the invoking node and an indication that the exit path is an exit path from the reusable component, where the context annotator is implemented in either of a) computer hardware configured to perform the functions of the context annotator, and b) computer software embodied in a physically tangible computer-readable storage medium.

In another embodiment of the invention, the context annotator is configured to annotate the entry path with a context type identifying the type of reuse context of the reusable component, and annotate the exit path with the context type.

In another embodiment of the invention, a computer program product is provided for annotating metamodels in support of performing context-sensitive analyses of reusable components of computer software applications, the computer program product including a physically tangible computer-readable storage medium, and computer program instructions operative to identify an entry path into a reusable component within a metamodel of a computer application development environment, where the entry path is from a node of the metamodel, to an invoking node of the metamodel and that follows the node, to the reusable component, and to a first node within the reusable component, where the reusable component is invokable by the invoking node, identify an exit path from the reusable component within the metamodel, where the exit path is from a last node within the reusable component, to the invoking node, and to a node of the metamodel and that follows the invoking node, annotate the entry path with a reference to the invoking node and an indication that the entry path is an entry path into the reusable component, and annotate the exit path with a reference to the invoking node and an indication that the exit path is an exit path from the reusable component, where the computer program instructions are stored on the computer-readable storage medium.

In another embodiment of the invention, the computer program instructions are operative to annotate the entry path with a context type identifying the type of reuse context of the reusable component, and the computer program instructions are operative to annotate the exit path with the context type.

BRIEF DESCRIPTION OF THE SEVERAL VIEWS OF THE DRAWINGS

The invention will be understood and appreciated more fully from the following detailed description taken in conjunction with the appended drawings in which.

DETAILED DESCRIPTION

Figure 1:
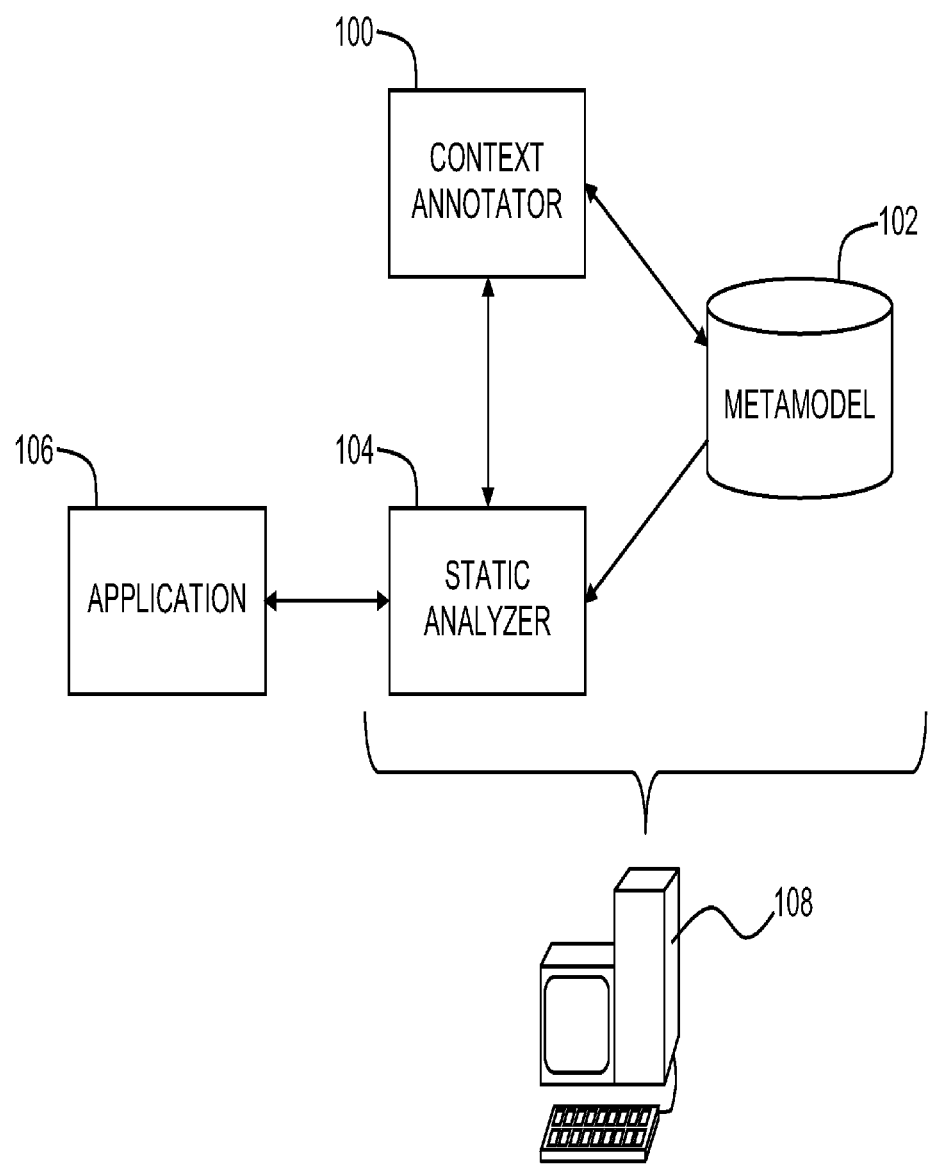
FIG. 1 is a simplified conceptual illustration of a system for using metamodels in support of performing context-sensitive analysis of reusable component of computer software applications, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of an embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for using metamodels in support of performing context-sensitive analysis of reusable component of computer software applications, constructed and operative in accordance with an embodiment of the invention. In the system of FIG. 1 a metamodel 102 is shown of a computer application development environment, such as, but not limited to, computer programming languages such as C++ and Java™, as well as data warehousing application development tools such as IBM Infosphere Datastage™, commercially available from international Business Machines Corporation, Armonk, N.Y. Metamodel 102 is annotated by a context annotator 100 to indicate entry paths into components known to be of a reusable type, such as procedures or functions, that may have different behavior in different contexts. Context annotator 100 similarly annotates metamodel 102 to indicate exit paths from the reusable components. A static analyzer 104 performs static analysis on a computer software application 106, and uses metamodel 102, after it has been annotated to indicate reusable component entry and exit paths to perform a context-sensitive traversal of reusable components found within computer software application 106. Metamodel 102. context annotator 100, and static analyzer 104 may be implemented as a computer program product embodied in a computer-readable medium, such as in the form of computer program data and/or instructions stored on magnetic, optical, or other physical storage media and/or embedded within computer hardware, and may be executed by or otherwise accessible to a computer 108.

Figure 2:
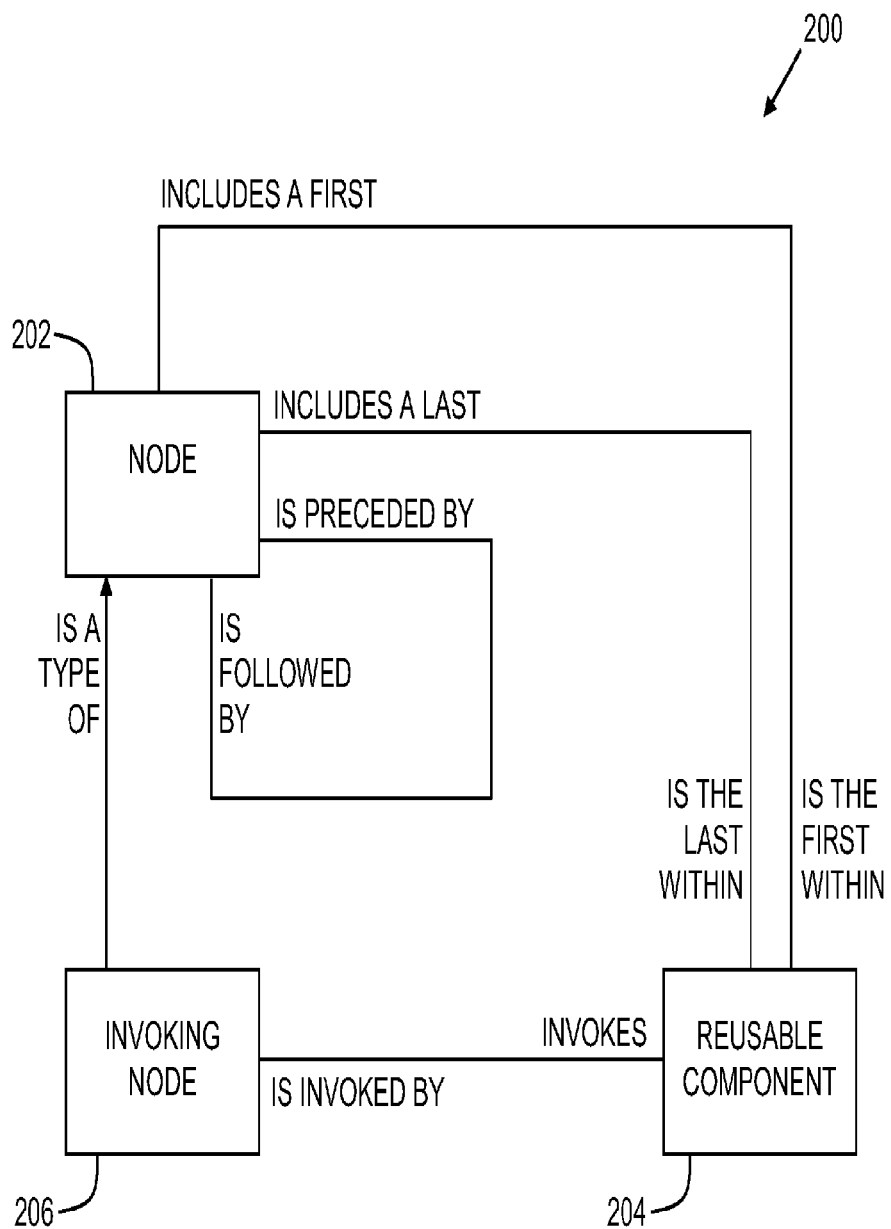
FIG. 2 is a simplified conceptual illustration of a portion of a generic metamodel showing a reusable component, useful in understanding the invention.

Reference is now made to FIG. 2, which is a simplified conceptual illustration of a portion of a generic metamodel showing a reusable component, useful in understanding the invention. In FIG. 2, a metamodel portion, generally designated 200, includes a node 202 of a computer application development environment. Node 202 may, for example, represent an instruction of a programming language such as C++, or a stage in a data warehousing application development environment such as IBM Infosphere Datastage™. A reusable component 204 is shown that typically has different behavior in different contexts, such as, for example, where reusable component 204 represents a function or procedure of C++, or a generic stage in IBM Infosphere Datastage™, such as a generic record sorting stage to which records of various types may be passed. Reusable component 204 is preferably invoked by an invoking node 206, where invoking node 206 is a type of node 202. Various relationships between node 202, reusable component 204, and invoking node 206 are shown as follows:

Reusable component 204 may include one or more nodes 202, including a first node and a last node. For example, a given reusable component 204 may be a procedure-type programming instruction that itself includes one or more instructions in a series of instructions, including a first instruction of the series and last instruction of the series.

Node 202 may be preceded by another node 202 and may be followed by another node 202. For example, a given node 202 may be an instruction that may itself be preceded by an instruction and followed by an instruction.

Invoking node 206 may invoke reusable component 204. For example, a given invoking node 206 may be a function call, and a given reusable component 204 may be an invokable function.

Figure 3:
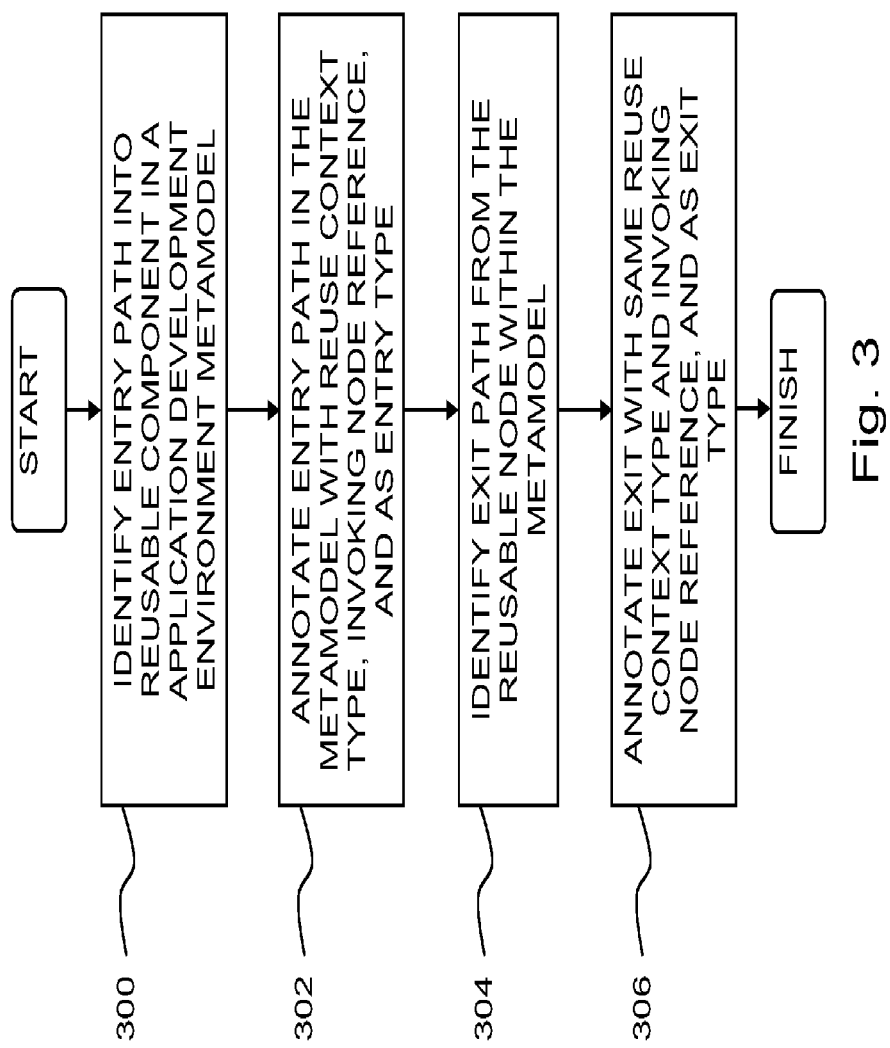
FIG. 3 is a simplified flowchart illustration of a method for annotating a metamodel in support of performing context-sensitive analysis of reusable components of computer software applications, operative in accordance with an embodiment of the invention.

Reference is now made to FIG. 3, which is a simplified flowchart illustration of a method for annotating a metamodel in support of performing context-sensitive analysis of reusable components of computer software applications, operative in accordance with an embodiment of the invention. In the method of FIG. 3, which may be implemented by a human operator using context annotator 100 of FIG. 1 on a metamodel such as metamodel 200 of FIG. 2, an entry path into a component known to be of a reusable type is identified in a metamodel from a node that is followed by an invoking node, via the reusable component, and to the first node within the reusable component, where the reusable component is invoked by an invoking node (step 300). The entry path is annotated with a context type identifying the type of reuse context, a reference to the invoking node, and an indication that the path is an entry path into the reusable component (step 302). An exit path from the reusable component is identified within the metamodel from the last node within the reusable component, via the invoking node, and to the node following the invoking node (step 304). The exit path is annotated with the same context type as the entry path, a reference to the invoking node, and an indication that the path is an exit path out of the reusable component (step 306).

Figure 4:
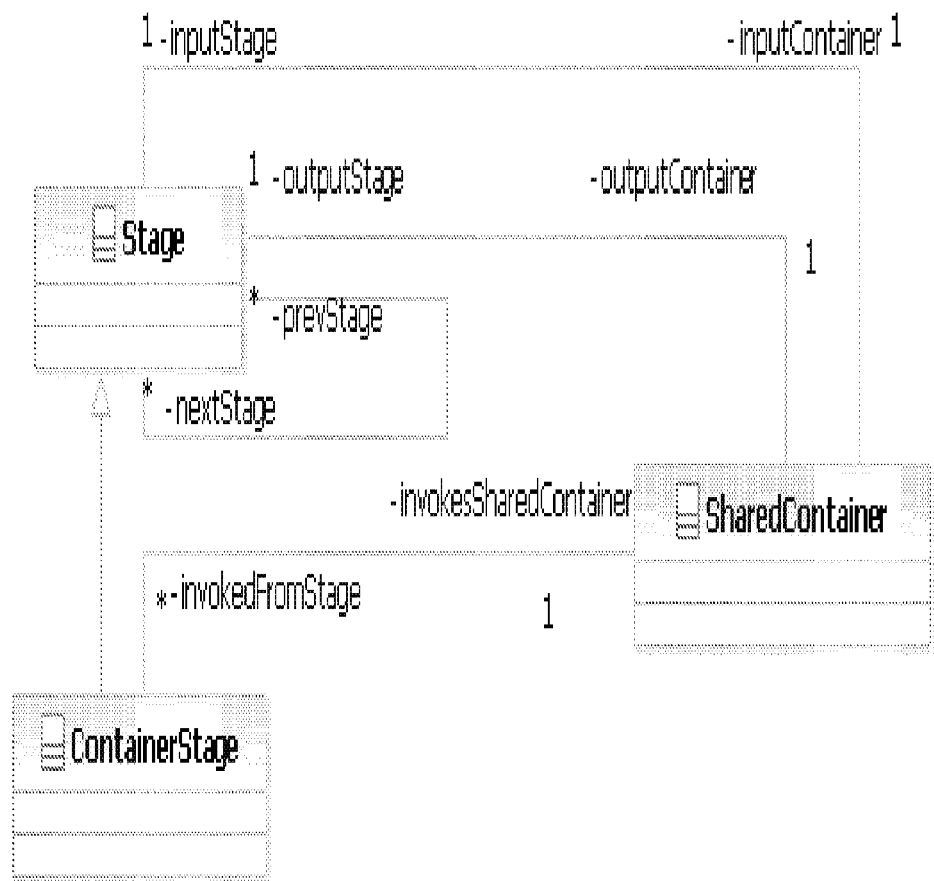
FIG. 4 is a simplified conceptual illustration of a portion of an exemplary metamodel showing a reusable component, useful in understanding the invention.

An exemplary implementation of the method of FIG. 3 may be seen with reference to FIG. 4, which is a simplified conceptual illustration of a portion of a metamodel of IBM Infosphere Datastage™. In the metamodel portion shown in FIG. 4 and generally designated 400, an entry path into a reusable component labeled as ContainerStage is identified and labeled as nextStage_viaSharedContainerEntry, where the entry path is defined as:

For where Stage→nextStage is a ContainerStage: Stage→ nextStage(ContainerStage)→invokesSharedContainer→inputStage and an exit path is identified and labeled as nextStage_viaSharedContainerExit, where the exit path is defined as:

For where Stage→outputContainer exists (is not null): Stage→outputContainer→invokedFromStage→nextStage The entry and exit paths are annotated as follows:
Reference nextStage_viaSharedContainerEntry
    contextName=sharedContainerInvocation
    referenceToContextValue=[nextStage: ContainerStage]
    mode=[Entry]
Reference nextStage_viaSharedContainerExit
    contextName=sharedContainerInvocation
    referenceToContextValue=[prevStage: ContainerStage]
    mode=[Exit]

Figure 5A:
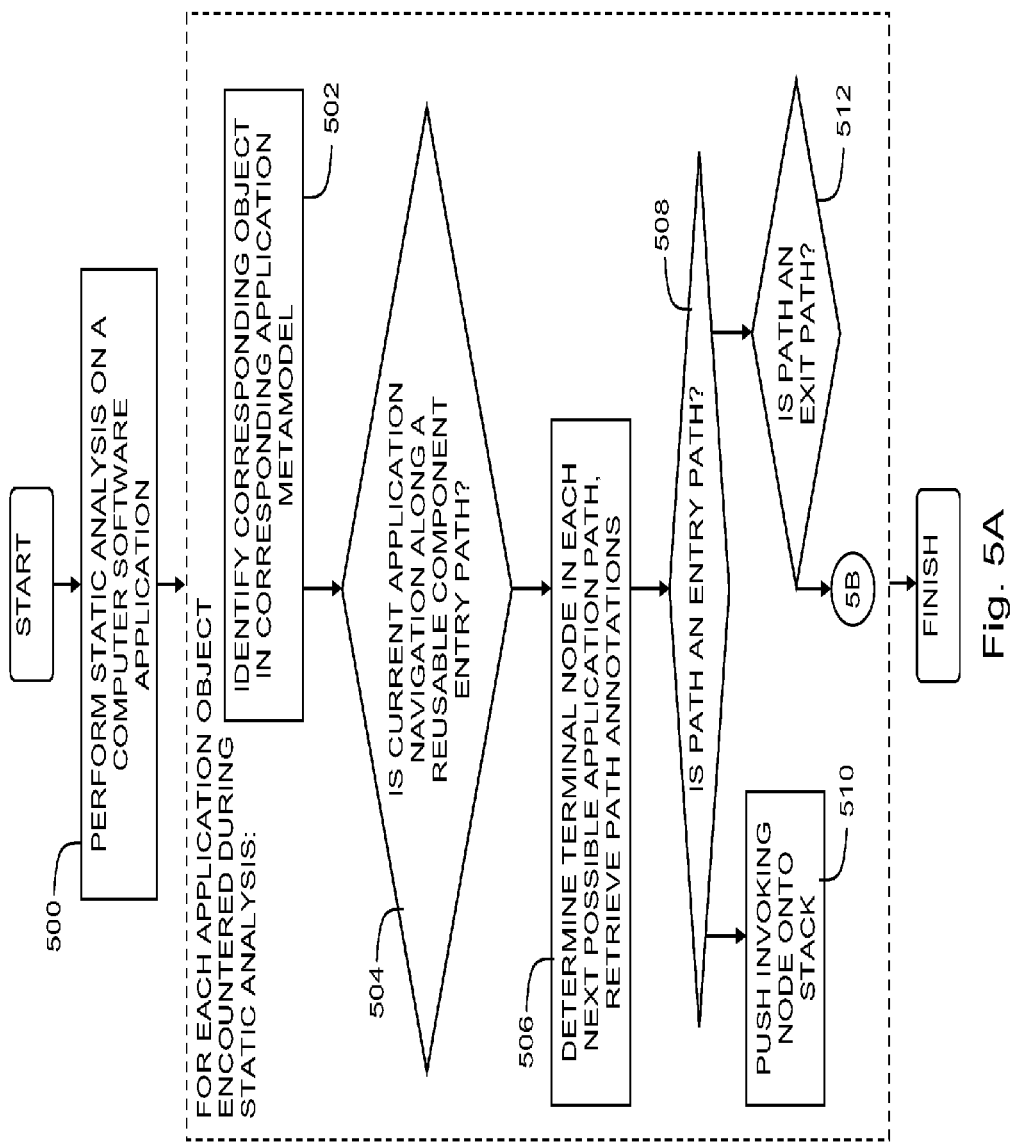
FIGS. 5A and 5B, taken together, are a simplified flowchart illustration of a method for using a metamodel in support of performing context-sensitive analysis of reusable components of computer software applications, operative in accordance with an embodiment of the invention.
Figure 5B:
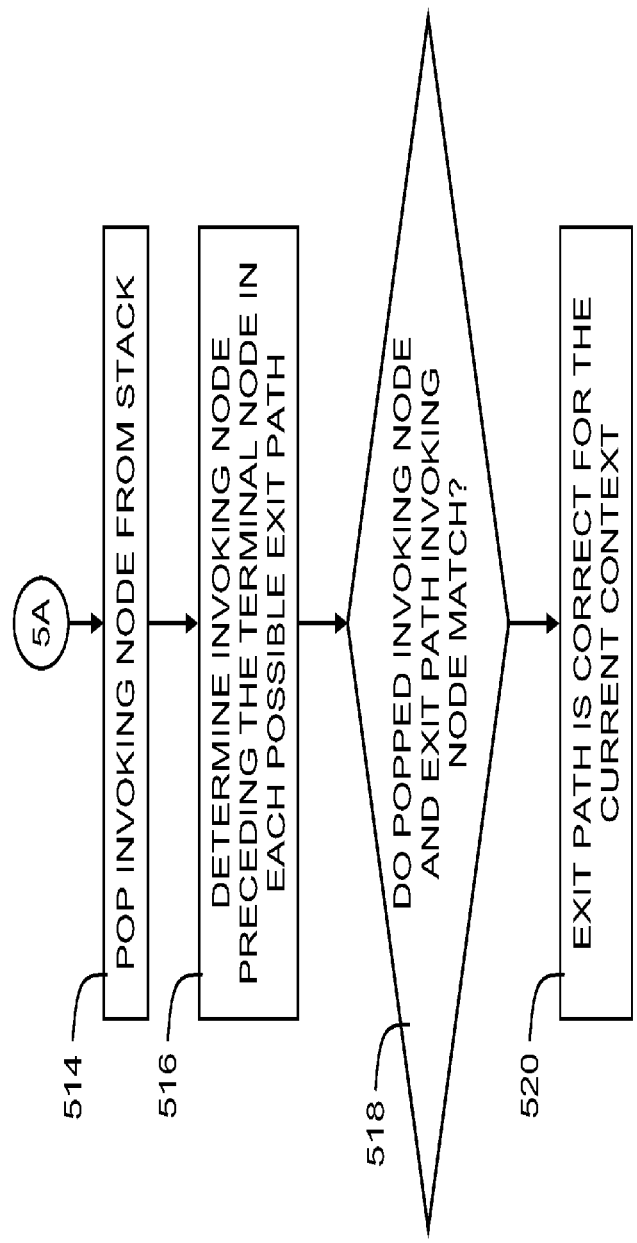

Reference is now made to FIGS. 5A and 5B which, taken together, are a simplified flowchart illustration of a method for using a metamodel in support of performing context-sensitive analysis of reusable components of computer software applications, operative in accordance with an embodiment of the invention. In the method of FIG. 5, which may be implemented by static analyzer 104 of FIG. 1 using a metamodel such as metamodel 200 of FIG. 2 that has been annotated such as using the method described in FIG. 3, static analysis is performed on a computer software application using conventional techniques, except as otherwise described herein (step 500). For each object (e.g., instruction, stage) encountered during navigation within the application, a metamodel of the application's application environment is consulted to identify an object corresponding to the application object, where the metamodel has been annotated with regard to reusable components as described hereinabove (step 502). When navigation within the application is to proceed from the application object's location along a path that corresponds in the metamodel to an entry path into a reusable component as described above, or to an exit path from a reusable component as described above (step 504), the identifier of each terminal node $N_E$ along each next possible path in the application is preferably retrieved, and the annotations of the entry or exit path are inspected (step 506). If the annotations indicate that the path is an entry path (step 508), the invoking node identifier $R_I$ for that path is retained, preferably by pushing it onto a stack S that corresponds to the context indicated by the annotation (step 510). If the annotations indicate that the path is an exit path (step 512), the retained invoking node identifier $R_I$ is retrieved, such as by popping it off of the top of stack S (step 514). For each next node $N_E$ identified along each possible exit path, the identity $N_I$ of the invoking node preceding the terminal node $N_E$ is determined (step 516). The exit path whose invoking node $N_I$ matches the retained invoking node $R_I$ (step 518) is the correct path for the current context (step 520).

Figure 6A:
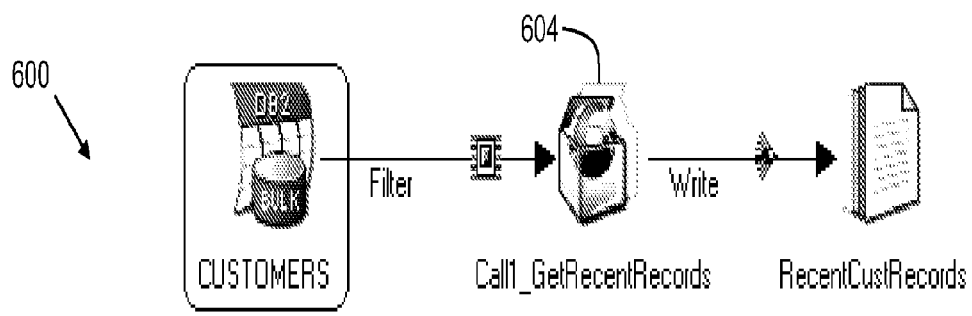
FIGS. 6A-6C are simplified conceptual illustrations of a portion of an exemplary model of an application, illustrating various stages of application of the method of FIG. 5, operative in accordance with an embodiment of the invention.
Figure 6A:
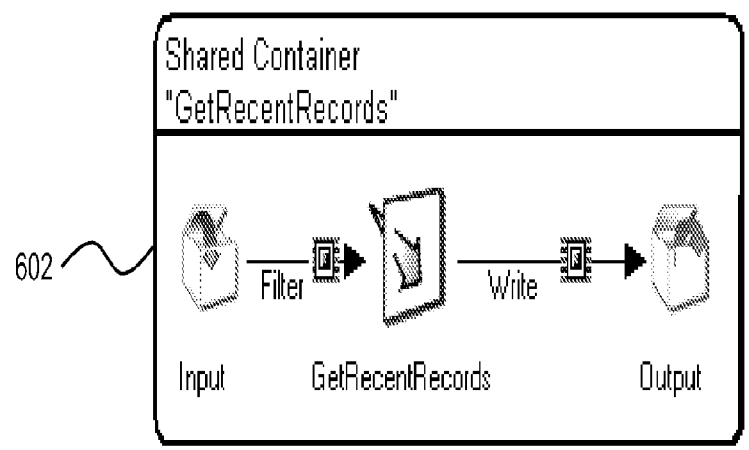
Figure 6A:
Figure 6B:
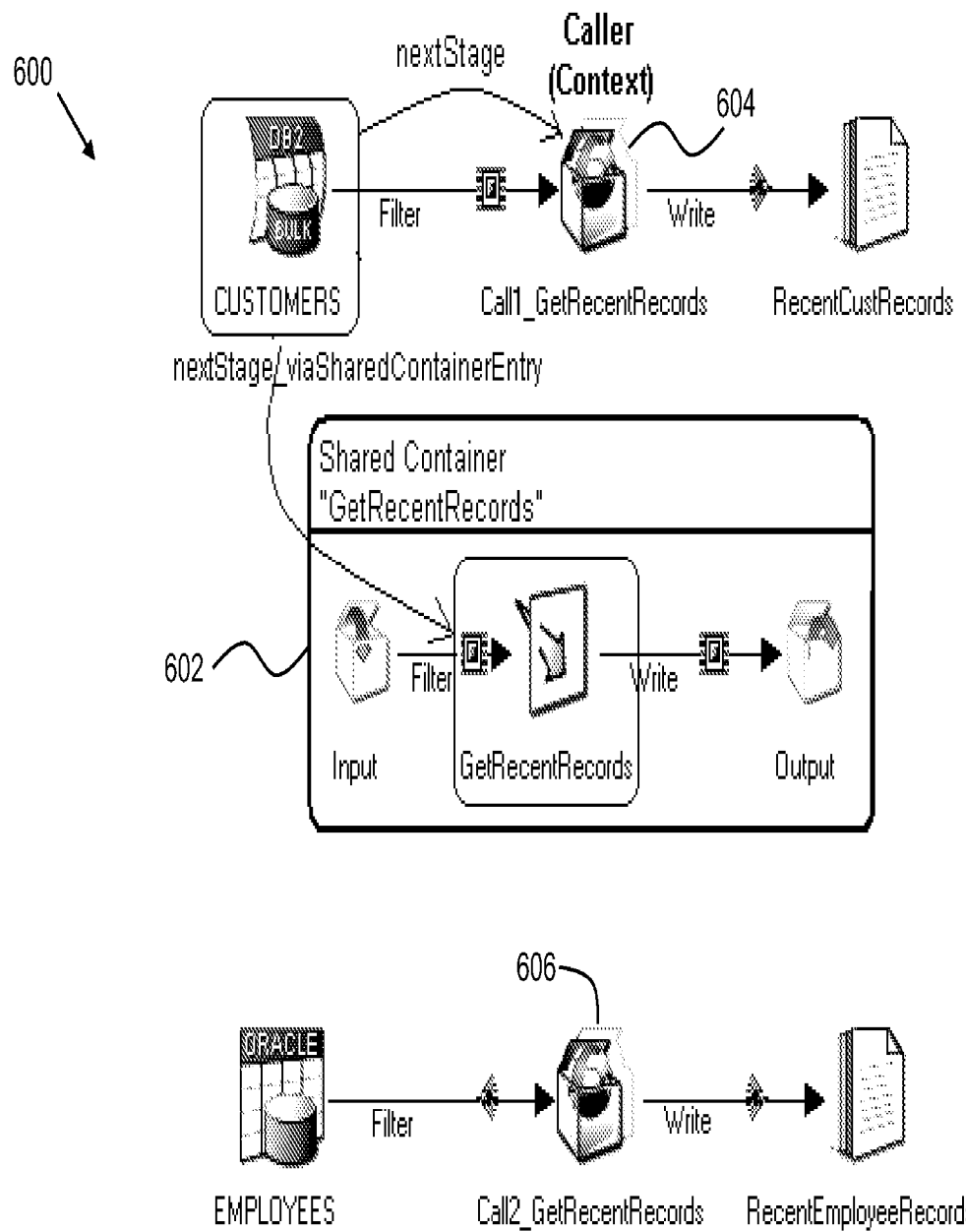
Figure 6C:
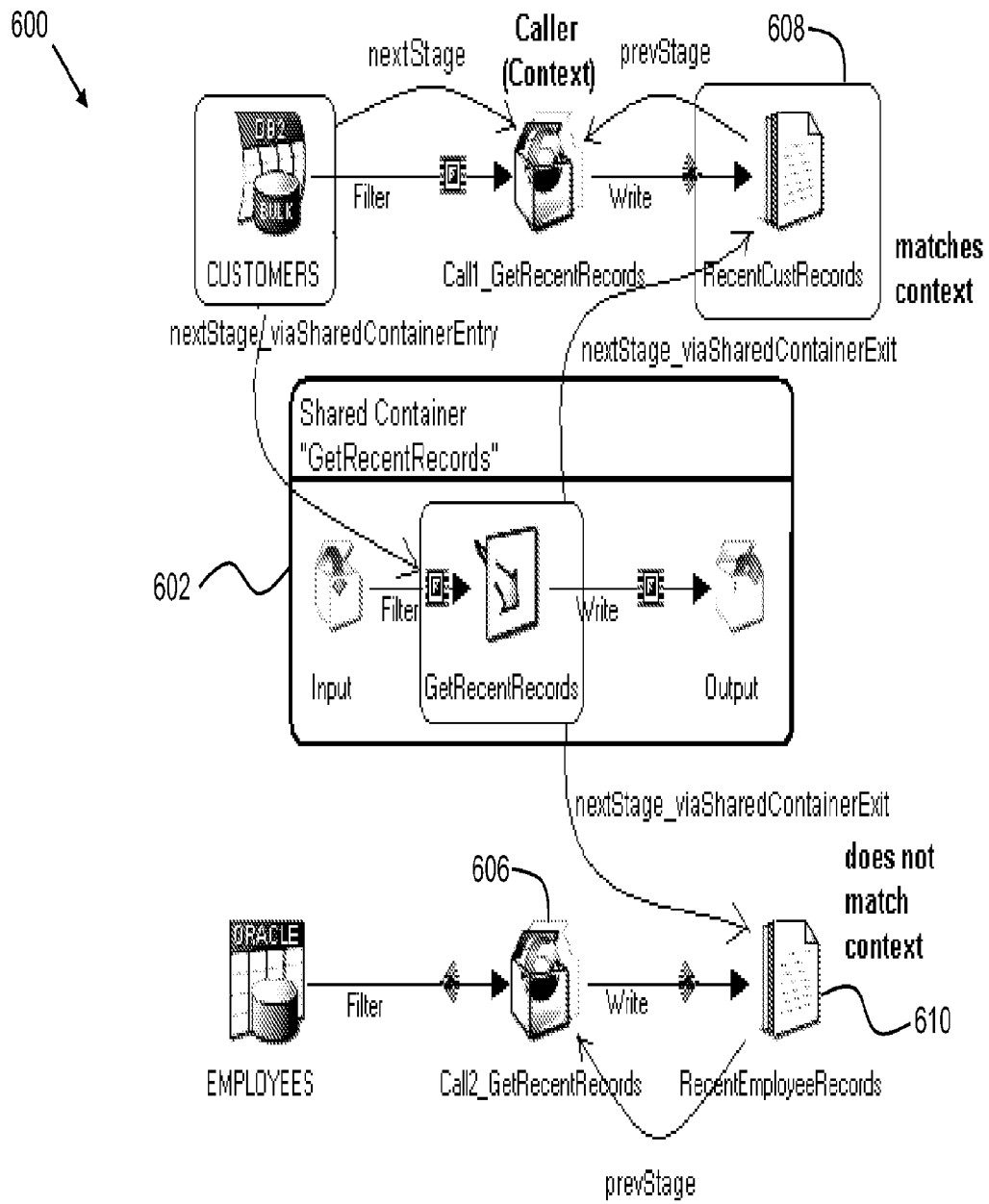

Continuing with the example shown in FIG. 4, an exemplary implementation of the method of FIG. 5 may be seen with reference to FIGS. 6A-6C, which are simplified conceptual illustrations of a portion of a model of an IBM Infosphere Datastage™ application, generally designated 600, illustrating various stages of the method of FIG. 5. In FIG. 6A, static analysis that is performed on application 600 identifies a shared container 602 labeled as GetRecentRecords as a reusable component that may be invoked by a container stage 604 labeled as Call1_GetRecentRecords or by a container stage 606 labeled as Call2_GetRecentRecords. In performing static analysis to determine an application flow path from a stage 608 labeled as Customers, a record of the navigation state is preferably maintained including navigation path information as well as a record of the context of the analysis, which prior to navigating from Customers are as follows:

NavigationState:
    NavigationPath: CUSTOMERS, [ ]
    ContextMap: [ ]

Navigation then continues as shown in FIG. 6B to container stage 604, which the static analyzer determines from annotated metamodel 400 as laying along the entry path nextStage_viaSharedContainerEntry, and thus requiring a context-sensitive analysis. The next node along the path is GetRecentRecords. The annotations for the entry path in metamodel 400 are as follows:

contextName=sharedContainerInvocation
referenceToContextValue=[nextStage: ContainerStage]
mode=[Entry]

and the invoking node is Call1_GetRecentRecords, which is preferably pushed onto a stack corresponding to the sharedContainerInvocation context.

At this point, the navigation state is as follows:
NavigationState after application:
    NavigationPath:
        CUSTOMERS,
        [nextStage_viaSharedContainerEntry, GetRecentRecords]
    ContextMap:
        sharedContainerInvocation→
            Stack [Call1_GetRecentRecords]

Navigation then continues as shown in FIG. 6C along the exit path nextStage_viaSharedContainerEntry indicated in annotated metamodel 400, which when applied to model 600 results in two possible exit paths terminal nodes, one to a stage 608 labeled as RecentCustRecords, and the other to a stage 610 labeled as RecentEmployeeRecords. The annotations for the exit path in metamodel 400 are as follows:
    contextName=sharedContainerInvocation
    referenceToContextValue=[prevStage: ContainerStage]
    mode=[Exit]

Both application exit paths share the same context according to metamodel 400, namely sharedContainerInvocation. However, each application exit path has a different invoking node preceding its terminal node as follows:
    RecentCustRecords—prevStage→Call1_GetRecentRecords
    RecentEmployeeRecords—prevStage→Call2_GetRecentRecords The desired navigation path is then determined by examining the invoking node that is found on the stack and comparing it to the invoking nodes of the two application exit paths. Since only the invoking node of RecentCustRecords—prevStage→matches the invoking node popped off the stack, namely Call1_GetRecentRecords, the exit path from the reusable component GetRecentRecords to RecentCustRecords is the correct exit path for the given navigational context. Thus, the navigation state is as follows:
NavigationState after application:
    NavigationPath:
        CUSTOMERS,
        [nextStage_viaSharedContainerEntry, GetRecentRecords],
        [nextStage_viaSharedContainerExit, RecentCustRecords]
    ContextMap:
        sharedContainerInvocation→[ ]

It will be appreciated that any aspect of the invention described hereinabove may be implemented as a computer program product embodied in a computer-readable medium, such as in the form of computer program data and/or instructions stored on magnetic, optical, or other physical storage media and/or embedded within computer hardware, and may be executed by or otherwise accessible to computer 108 (FIG. 1).

Figure 7:
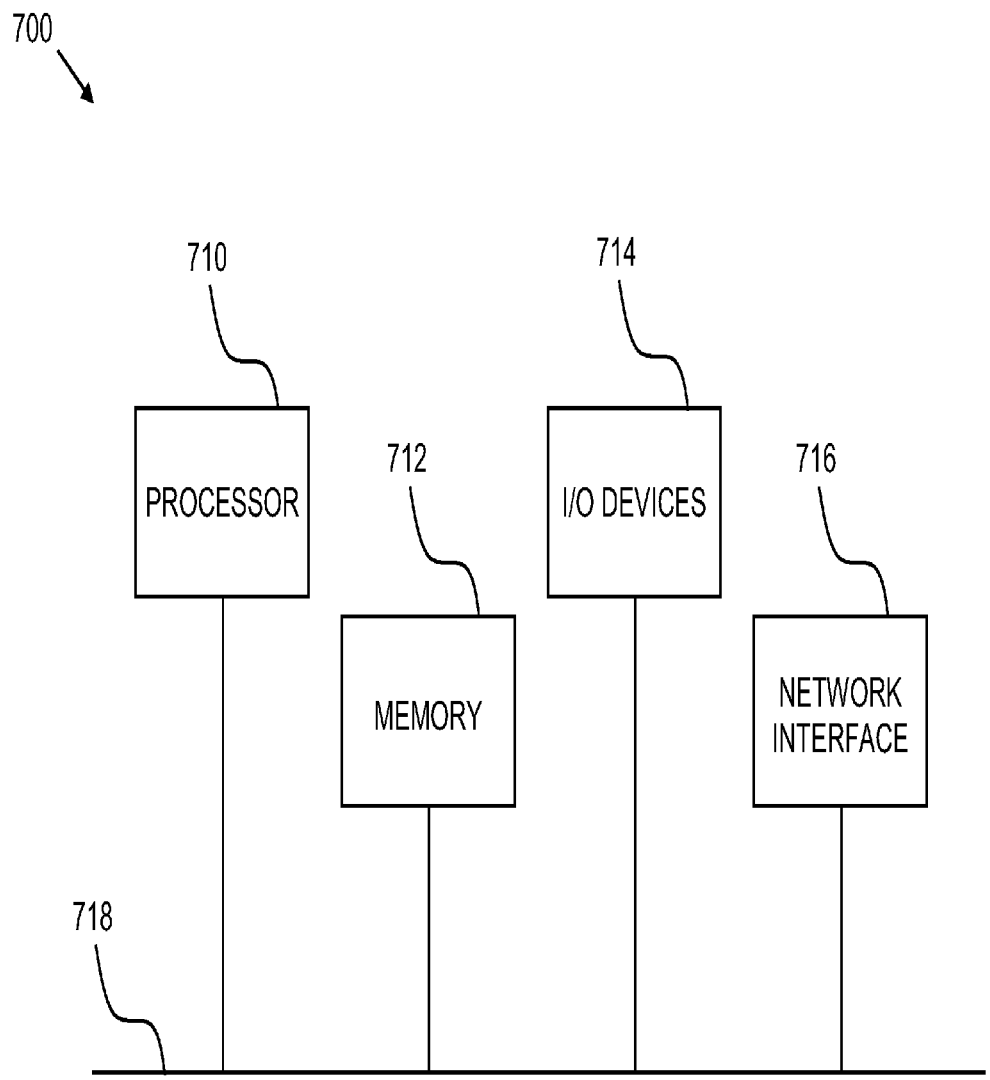
FIG. 7 is a simplified block diagram illustrating an exemplary hardware implementation of a computing system, constructed and operative in accordance with an embodiment of the invention.

Referring now to FIG. 7, block diagram 700 illustrates an exemplary hardware implementation of a computing system in accordance with which one or more components/methodologies of an embodiment of the invention (e.g., components/methodologies described in the context of FIGS. 1-6C) may be implemented.

As shown, the techniques for controlling access to at least one resource may be implemented in accordance with a processor 710, a memory 712, I/O devices 714, and a network interface 716, coupled via a computer bus 718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for using metamodels in support of performing context-sensitive static analyses of reusable components of computer software applications, the method comprising:
identifying, via a processor, an entry path into a reusable component within a metamodel of a computer application development environment, wherein said entry path is from a first node of said metamodel to one of a plurality of invoking nodes of said metamodel that follows said first node, and from the one of a plurality of invoking nodes to a first component node within said reusable component, wherein said reusable component is invokable by the plurality of invoking nodes;
identifying, via a processor, a plurality of exit paths from said reusable component within said metamodel, wherein said exit paths are from a last component node within said reusable component to one of the plurality of invoking nodes, and from one of the plurality of invoking nodes to one of a plurality of terminal nodes of said metamodel;

selecting an object in a computer software application during a static analysis of said computer software application, via a processor, wherein said computer software application is developed using said computer application development environment to which said metamodel relates;

determining during said static analysis that navigation within said computer software application is to proceed from said object's location along a path;

consulting said metamodel and in response to determining from said metamodel that the path of said computer software application corresponds to the entry path of said reusable component of said metamodel storing a first identifier which identifies an invoking node from the plurality of invoking nodes; and consulting said metamodel and in response to determining from said metamodel that the path of said computer software application corresponds to an exit path of said reusable component of said metamodel, retrieving the first identifier which identifies the invoking node, and for each terminal node along each of the plurality of exit paths from said object:

comparing, via a processor, a second identifier of a second invoking node that precedes said terminal node with said first identifier; and determining, via a processor, that said path among said plurality of exit paths is a correct path for a current context of said static analysis with respect to said reusable component in response to a match between the first and second identifiers.

2. The method according to claim 1 further comprising:

annotating said entry path with a reference to said one of the plurality of invoking nodes and an indication that said entry path is an entry path into said reusable component; and annotating said exit paths with a reference to a corresponding invoking node from the plurality of invoking nodes and an indication that said exit paths are from said reusable component.

3. The method according to claim 2 wherein:

said step of annotating said entry path comprises annotating said entry path with a context type identifying the type of reuse context of said reusable component; and said step of annotating said exit paths comprises annotating said exit paths with said context type, wherein said entry path and the exit path determined to be the correct path are annotated with the same context type.

\* \* \* \* \*